United States Patent [19]  [11]  4,391,855
Geeck  [45]  Jul. 5, 1983

[54] CORROSION RESISTANT COATING AND METHOD FOR COATING METAL SUBSTRATE

[75] Inventor: Thurlow Geeck, Hillsdale, Mich.

[73] Assignee: Depor Industries, Troy, Mich.

[21] Appl. No.: 372,980

[22] Filed: Apr. 29, 1982

Related U.S. Application Data

[63] Continuation of Ser. No. 180,900, Aug. 25, 1980, abandoned.

[51] Int. Cl.³ ............................................. B05D 3/02
[52] U.S. Cl. .................................. 427/383.7; 427/386; 427/388.1; 427/388.2; 427/388.5; 524/233; 524/317; 524/364
[58] Field of Search ................ 427/386, 383.1, 383.7, 427/388.1, 388.2, 388.5; 524/317, 364, 233

[56] References Cited

U.S. PATENT DOCUMENTS 2,709,664  5/1955  Evans .............................. 427/386 X
2,887,458  5/1959  Fitzgerald et al. ............. 427/386 X
3,738,862  6/1973  Klarquist et al. .................. 427/386
4,186,036  1/1980  Elms et al. ..................... 148/6.15 R

*Primary Examiner*—Thurman K. Page
*Attorney, Agent, or Firm*—Barnes, Kisselle, Raisch, Choate, Whittemore & Hulbert

[57] ABSTRACT

A coating and method of protecting a metal substrate from corrosion by applying a thin film of a liquid composition on the substrate and heating the wet film to an elevated temperature for a period of time to dry or cure the film and thereby adhere a protective coating to the substrate without the maximum temperature of the substrate exceeding about 500° F. and preferably 450° F. The composition contains a primary corrosion inhibitor of powdered metal dispersed in a bonding material of linear epoxy or phenoxy resin and a vehicle of active and inactive organic solvents. Preferably, the composition also includes secondary corrosion inhibiting resins, a thioxotropic material, a hygroscopic material, a powdered metal suspension agent, and a material to neutralize the acidity of the linear epoxy or phenoxy resin.

19 Claims, No Drawings

CORROSION RESISTANT COATING AND METHOD FOR COATING METAL SUBSTRATE

REFERENCE TO A COPENDING APPLICATION

This is a continuation of copending U.S. patent application Ser. No. 180,900 filed on Aug. 25, 1980 and abandoned in favor of and after filing of this application.

This invention relates to coatings for metal substrates and, more particularly, to coatings protecting a metal substrate from corrosion.

Many prior processes and coatings have been developed for protecting metal substrates and particularly plain carbon steel substrates, from both direct and electro-chemical corrosion. The resistance to corrosion of steel substrates has been improved by applying various organic and metal coatings thereto such as phosphate, paint, zinc, and lead. Phosphate and paint are frequently applied to steel substrates by dipping, rolling, and spraying. Zinc has been applied to electroplating and hot dipping to produce galvanized steel. An alloy of lead and tin has been applied to steel substrates to produce terneplate. Frequently, resistance to corrosion of galvanized steel and terneplate is further improved by applying a coating of a corrosive resistant material thereto.

With these and other prior methods of providing corrosion resistance, it is difficult, and in many instances, impossible to provide adequate corrosion resistance for steel substrates while preserving their weldability and solderability, and avoiding hydrogen embrittlement, thermal distortion, and a significant decrease in yield strength, ductility, and formability.

Objects, features, and advantages of this invention are to provide a coating method and composition for a metal substrate, such as steel, which provides significantly improved protection of the substrate from corrosion; has markedly superior adhesion to the substrate; adheres to terneplate; is not significantly affected by scratches in the coating; prohibits the spreading of corrosion from a scratch; has a marked tendency to burnish in over a cut or sheered edge, thereby significantly decreasing and confining any corrosion; can be uniformly applied in a thin film; improves the torque-tension relationship of threaded fasteners to which it is applied; enhances the formability of the substrate; increases the life of dies forming the substrate to which it is applied; provides coated substrates which can be readily welded and soldered together; flows back to the edge of the welded or soldered area of coated substrates, thereby improving corrosion resistance; may include a coloring pigment; can be easily, readily, and economically applied in one coat; and may be cured in a short period of time at a relatively low temperature, thereby resulting in substantial energy and cost savings, avoiding thermal distortion of thin substrates and particularly thin terneplate substrates, permitting use of thinner substrates, and usually eliminating the need for killed steel in thin substrates to achieve adequate yield strength and ductility of the coated substrates.

These and other objects, features, and advantages of the corrosive resistant coating and method of this invention will be apparent from a perusal of the following detailed description and appended claims.

DETAILED DESCRIPTION

In the composition of the coating of this invention, the primary corrosion inhibitor is believed to be a finely powdered metal which is dispersed in a linear epoxy or phenoxy resin bonding material and a vehicle of active and inactive solvents. A thin uniform film is produced by a thixotropic agent and the corrosion inhibiting efficacy of the composition is enhanced by secondary corrosion inhibiting agents and resins. Preferably, the composition also contains hygroscopic, metal suspension, and neutralizing materials.

In use, a thin layer of the composition is applied to the metal substrate such as by dipping, rolling, brushing, or spraying. The applied layer is subjected to an elevated temperature for a relatively short period of time to evaporate the solvents and cure the layer, thereby tenaciously and permanently adhering a thin and uniform protective coating to the substrate.

Suitable powdered metals are zinc, cadmium, stainless steel, and aluminum having an average particle size not greater than about 40 microns with a maximum individual particle size of not more than 100 microns. Desirably, the powdered metal has an average particle size of less than 15 microns and preferably, in the range of about 2 to 5 microns with a corresponding maximum individual particle size of not more than about 60 and 30 microns respectively.

These powdered metals are commercially available from various sources. For example, powdered zinc and cadmium can be purchased from the Federated Metals Division of American Smelting and Refining Company, powdered stainless steel can be purchased from U.S. Bronze Powders, Inc., and powdered aluminum can be purchased from Reynolds Metals Company. Although nonleafing grades of aluminum are preferred for most applications, leafing grades may also be utilized. For most applications, the preferred powder metal primary inhibitor is zinc because it is believed to provide the most effective passivation for steel substrates.

The preferred bonding material is a thermoplastic linear epoxy or phenoxy resin having a molecular weight in the range of about 3,000 to 60,000. This linear epoxy or phenoxy resin is produced by an epichlorohydrin bisphenol-A reaction. This phenoxy resin has a high molecular weight and essentially no terminal epoxy groups which are highly reactive. Suitable commercially available linear epoxy and phenoxy resins are Araldite 45-E-50, 488-E-32, and 488-N-40 epoxy resins sold by Ciba-Geigy Corporation; Eponol Series 52-B-40, 53-L-32, 53-B-40, 55-L-32, and 55-B-40 epoxy resins sold by Shell Chemical Company; and Phenoxy PKHH, PAHJ, and PKDA-8500 sold by Union Carbide Corporation. The Ciba-Geigy linear epoxy or phenoxy resins are preferred because they are believed to produce coatings having the best adhesion characteristics. Although satisfactory for many applications, the Phenoxy resins are believed to produce coating having poorer adhesion than coatings utilizing the Eponol resins.

The corrosion inhibiting properties of the composition, particularly its resistance to salt spray, are improved by the addition of secondary corrosion inhibiting resins. These secondary resins also increase the resistance of the coating to certain solvents which as brake fluid and gasoline. Suitable secondary resins are phenolic, triazine, melamine-formaldehyde, urea-formaldehyde, and hexomethoxymethyl-melamine resins. Suitable secondary resins available from Ricchold Chemical Company are melamine-formaldehyde (MM-55 RCI, MM-83-RCI, MM-46-RCI, MM-47-RCI), urea-formaldehyde (F-200-E RCI, F-222-E RCI, F-240-E RCI), triazine (MX-61 RCI), and phenolic (Varcum 1281-B). A suitable hexomethoxymethylmelamine resin is available from American Cyanamid Co. (Cymel 300, Cymel 301). Suitable phenolic resins are also available from Union Carbide Corporation (BKR-2620), Ciba-Geigy Corp. (HZ-949-U), and General Electric Co. (Methylon 75108, Methylon 75202).

These secondary resins are believed to produce improved corrosion and solvent resistance. In the composition, these secondary resins may comprise about 1% to 25% by weight of the linear epoxy or phenoxy resin, and desirably, about 5% to 20% and, preferably 10% to 15% by weight of the linear epoxy or phenoxy resin. The adhersion characteristics of the coating tend to be degraded if significantly more than about 25% by weight of these corrosion inhibiting resins are used. Thus, at least 80% by weight of the total resin system should consist of linear epoxy or phenoxy resins.

The total amount of resin (linear epoxy or phenoxy plus any secondary corrosion inhibiting resins) of the composition may be in the range of about 10% to 525% by weight of the metallic powder, more desirably, in the range of about 12% to 100% by weight, and preferably, in the range of about 14% to 50% by weight of the metal powder. Generally increasing the percent or ratio of the total resin to powdered metal increases the adhesion and decreases the corrosion resistance provided by the cured coating.

Preferably, a suspension agent is used to assure that the powdered metal does not settle out of the coating composition and form a hard cake. A suitable suspension agent is polyethylene which can be purchased as MPA-60X from Baker Castor Oil Company and MRT-1 from Matteson-Rudolfi, Inc. MPA-60 is essentially one part polyethylene in three parts xylene by weight. MRT-1 is also believed to be essentially one part polyethylene in three parts xylene by weight. The amount of polyethylene used as a suspension agent may be about 0.2% to 5% by weight of the metal powder and preferably, about 0.4% to 2.6% by weight of the metal powder. This is equivalent to about 0.8% to 20% and 1.6% to 10.4% by weight respectively of the MPA-60X.

To assure that the composition does not gel prior to being cured by the application of heat and to produce a thin coating on the substrate with the powdered metal uniformly distributed therein, the composition includes a thixotropic agent. A suitable thixotropic agent is silane treated silica dioxide which is believed to also improve the salt spray corrosion resistance of the coating. Silane treated silica dioxide thixotropic agents are commercially available from Tulco Corporation Tullanox 292 & 500), Cabot, Inc. (Cabosil M-5), and DeGussa Corporatio (R-972).

The amount of thixotropic agent in the composition may be about 0.4% to 12% by weight of the powdered metal and preferably about 1% to 6% by weight of the powdered metal. An appropriate amount of the thixotropic agent may modestly improve the corrosion resistance of the composition but an excess amount is believed to result in a porous thin coating, thereby having a deleterious effect on its corrosion resistance.

Preferably, the composition also contains a water scavenger or hygroscopic agent such as calcium oxide, silica dioxide, barium oxide, and potassium chloride. Suitable silica dioxide is commercially available from Davidson Chemical Co. (Syloid AL-1 & ZN-1). The amount of hygroscopic material in the composition may be about 0.2% to 12% by weight of the powdered metal and preferably, about 0.4% to 6% by weight of the powdered metal. An excess amount of hygroscopic material is believed to decrease the corrosion resistance of the coating.

Preferably, the acidity of the linear epoxy or phenoxy resin is neutralized by adding a sufficient quantity of calcium oxide. Usually, a quantity of calcium oxide equal to about 0.8% to 3% by weight of the linear epoxy or phenoxy resin is sufficient. This calcium oxide may also be a water scavenger.

The vehicle or carrier of the composition contains both active and inactive organic solvents. Suitable active solvents for the linear epoxy or phenoxy resin are cellosolve acetate, methyl ethyl ketone, methyl isobutyl ketone, dimethylformamide, and acetone. Suitable inactive solvents are the aromatic hydrocarbons such as xylol, xylene, and toluene, and alcohols such as methanol, ethanol, n-propanol, iso-propanol, n-butanol, and iso-butanol. Suitable commercially available aromatic hydrocarbon solvents are available from Exxon Corp. (SC 100 & SC 150). The SC 100 solvent has a boiling range of 311° F. to 344° F. and a flash point of 107° F. The SC 150 solvent has a boiling range of 370° F. to 410° F. and a flash point of 151° F. The inactive solvents decrease the cost of the vehicle and are believed to improve the adhesion and salt spray corrosion resistance of the coating. The vehicle may consist of about 10% to 40%, more desirably 15% to 35% and preferably 25% to 30% by weight of inactive solvents and the balance of preferably essentially active solvents.

The composition contains sufficient vehicle (active plus inactive solvents) to produce the viscosity desired for the particular method of applying the composition to a substrate. For application of the composition to a substrate by dipping, rolling, or spraying the viscosity of the composition may be in the range of 20 to 280 seconds, more desirably 30 to 180 seconds, and preferably 60 to 120 seconds with a Ford No. 4 cup. A composition viscosity in this range can usually be obtained when the vehicle by weight is about two to four times the weight of all of the resins in the composition.

The composition is made by mixing the linear epoxy or phenoxy resin and a suitable active solvent such as cellosolve acetate under slow agitation in a high speed mixer such as a Cowles dissolver. An appropriate amount by weight of active solvent is usually one to two times the weight of the linear epoxy or phenoxy resin. The calcium oxide, suspension agent, hygroscopic material, thixotropic material, and powdered metal are added to the mixture in the Cowles dissolver in the order listed. Thereafter, the speed of the impeller of the Cowles dissolver is increased and these constituents are mixed in the Cowles dissolver until they reach a temperature of about 120° F. to 180° F. and preferably 140° F. to 150° F. The mixture reaches this temperature in about 30 to 120 minutes and usually 60 to 75 minutes when the impeller is rotated at 1500 to 4500 rpm.

The heated mixture from the Cowles dissolver is milled in a sand mill adjusted and operated to produce a homogeneous mixture with a particle size having a Hegman grind rating of 4.5 H to 7.5 H. The homogeneous mixture from the sand mill is put in a suitable vessel and the remaining solvents or vehicle and the secondary corrosion resistant resins are added while the mixture is normally agitated such as by an impeller rotating at 150 rpm. The addition and thorough mixing of the remaining solvents and the secondary resins completes the making of the composition.

Thereafter, if needed to facilitate the particular method of application of a thin film of the composition on a metallic substrate, the viscosity of the composition may be decreased by the addition of a relatively small amount of a compatible solvent. Preferably, the compatible solvent is a mixture of the active and inactive solvents of the vehicle of the composition.

After a thin wet film of the composition with a thickness of about 1 to 3 mils is applied to the substrate, the wet film is heated to a relatively low elevated temperature for a sufficient period of time to evaporate the vehicle, thereby drying or curing and adhering the film to the substrate. The thickness of the cured film or coating is usually in the range of about 0.3 to 0.8 of a mil. The wet film can be dried at a low enough temperature for a period of about 90 minutes to 15 seconds so that the maximum temperature of the substrate is in the range of 200° F. to 500° F., and preferably for a period of about 50 minutes to 30 seconds and usually 30 seconds to 15 minutes, so that the maximum substrate temperature is about 300° F. to 450° F.

It has been found in practice that the cured film or coating tenaciously adheres to the metal substrate and provides excellent protection of the substrate from corrosion. This is believed to be the only coating which will adhere directly to terneplate. Steel substrates with the cured coating thereon can still be readily welded, soldered, and cold formed. Moreover, the relatively low temperature at which a thin film of the composition may be cured, does not thermally distort relatively thin sheet metal substrates and does not significantly decrease their yield strength and ductility, thereby eliminating the need for thin substrates of aluminum killed steel.

The following examples of compositions are illustrative of this invention and are not intended to limit the scope of the invention as defined by the appended claims.

EXAMPLE 1

The following materials were added in the order listed to a vessel under slow agitation using a high speed Cowles dissolver.

| Material | Parts By Weight |
|---|---|
| Linear epoxy or phenoxy resin (448-E-32, Ciba Geigy Corp.) with 32% solids by weight in cellosolve acetate | 296.28 |
| Calcium oxide | 2.54 |
| Suspension agent (MPA-60X, Baker Castor Oil Co.) | 13.70 |
| Hygroscopic agent (Syloid AL-1, Davidson Chemical Co.) | 2.50 |
| Thixotropic agent (Tullanox 500, Tulco Corp.) | 10.10 |
| Zinc powder (L-10, Federated Metals) | 546.90 |

These materials were mixed at a speed of about 3000 rpm with the Cowles high speed dissolver until the mixture was heated to a temperature of about 142° F. The heated mixture was then pumped into a sand mill and milled to produce a homogeneous mixture having a Hegman particle size grind rating of 6.5 H. Thereafter, the homogeneous mixture was blended with the following materials to produce the completed composition.

| Material | Parts By Weight |
|---|---|
| Solvent - Cellosolve acetate | 63.48 |
| Solvent - Aromatic hydrocarbon (SC 150, Exxon Corp.) | 55.10 |
| Resin - Phenolic resin (HZ 949-U, Ciba Geigy Corp.) with 50% solids by weight in Butanol | 9.40 |
| | 1000.00 |

A wet film of this composition was applied by roll coating on cold rolled steel coil stock and then heated for about 30 seconds with a maximum substrate temperature of about 440° F. to produce a thin coating (0.5 of a mil). The coating tenaciously adhered to the coil stock, and provided excellent protection of the coil stock from corrosion.

EXAMPLE 2

The following materials were added in the order listed to a vessel under slow agitation using a high speed Cowles dissolver.

| Material | Parts By Weight |
|---|---|
| Linear epoxy or phenoxy resin (Eponol 55-L-32, Shell Chemical Co.) with 32% solids by weight in cellosolve acetate | 241.90 |
| Calcium oxide | 1.87 |
| Suspension agent (MPA-60, Baker Castor Oil Co.) | 8.74 |
| Hygroscopic agent (Syloid ZN-1, Davidson Chemical Co.) | 3.02 |
| Thixotropic agent (R-972, DeGussa Corp.) | 5.68 |
| Zinc powder (L-10, Federated Metals) | 625.11 |

These materials were mixed at a speed of about 3700 rpm with the Cowles dissolver until the mixture was heated to a temperature of about 120° F. The heated mixture was then pumped into a sand mill and milled to produce a homogeneous mixture having a Hegman particle size grind rating of 5.0 H. Thereafter, the homogeneous mixture was blended with the following materials to produce the completed composition:

| Mixture | Parts By Weight |
|---|---|
| Solvent - Cellosolve acetate | 52.44 |
| Solvent - Aromatic hydrocarbon (SC 150, Exxon Corp.) | 43.70 |
| Resin - Phenolic resin (#75109 Methylon, General Electric Co.) with 50% solids by weight in xylol and butanol | 9.57 |
| Resin - Triazine (MX-61, Reichhold Chemicals, Inc.) in xylol and butanol | 7.57 |
| | 1000.00 |

A wet film of this composition was applied by spraying to tubing of terneplate and then heated for about 30 seconds with a maximum substrate temperature of about 430° F. to produce a thin cured coating (0.2 of a mil). This coating tenaciously adhered to the terneplate and provided excellent protection of the terneplate from corrosion.

EXAMPLE 3

The following materials were added in the order listed to a vessel under slow agitation using a high speed Cowles dissolver.

| Material | Parts By Weight |
| --- | --- |
| Linear epoxy or phenoxy resin (Eponol 53-L-32, Shell Chemical Co.) with 32% solids by weight in Cellosolve acetate | 435.00 |
| Calcium oxide | 1.87 |
| Suspension agent (MPA-60, Baker Castor Oil Co.) | 8.74 |
| Hygroscopic agent (Syloid ZN-1, Davidson Chemical Co.) | 3.02 |
| Thixotropic agent (Cabosil M-5, Cabot Corporation) | 5.68 |
| Cadmium powder (Federated Metals) | 406.00 |

These materials were mixed at a speed of about 4500 rpm with the Cowles dissolver until the mixture was heated to a temperature of about 150° F. The heated mixture was then pumped into a sand mill and milled to produce a homogeneous mixture having a Hegman particle size grind rating of 4.5 H. Thereafter, the homogeneous mixture was blended with the following materials to produce the completed composition:

| Material | Parts By Weight |
| --- | --- |
| Solvent - Cellosolve acetate | 51.69 |
| Solvent - Aromatic hydrocarbon (SC 100, Exxon Corporation) | 30.00 |
| Resin - Triazine (Reichhold Chemical, Inc.) with 60% solids by weight in xylol and butanol | 58.00 |
| | 1000.00 |

A wet film of this composition was applied by dipping to bolts and then heated for about 15 minutes with a maximum substrate temperature of about 375° F. to produce a thin cured coating (0.3 of a mil). This coating tenaciously adhered to the bolts and provided excellent protection of the bolts from corrosion.

EXAMPLE 4

The following materials were added in the order listed to a vessel under slow agitation using a high speed Cowles dissolver.

| Material | Parts By Weight |
| --- | --- |
| Linear epoxy or phenoxy resin (488-E-32, Ciba Geigy Corp.) with 32% solids by weight in Cellosolve acetate | 625.00 |
| Calcium oxide | 1.71 |
| Suspension agent (MPA-60, Baker Castor Oil Co.) | 8.20 |
| Hygroscopic agent (Syloid ZN-1, Davidson Chemical Co.) | 4.65 |
| Thixotropic agent (Cabosil M-5, Cabot, Inc.) | 4.14 |
| Stainless steel powder (Stay-steel, U.S. Bronze Powders, Inc.) | 200.00 |

These materials were mixed at a speed of about 1700 rpm with the Cowles dissolver until the mixture was heated to a temperature of about 125° F. The heated mixture was then pumped into a sand mill and milled to produce a homogeneous mixture having a Hegman particle size grind rating of 5.0 H. Thereafter, the homogeneous mixture was blended with the following materials to produce the completed composition:

| Material | Parts By Weight |
| --- | --- |
| Solvent - Cellosolve acetate | 100.00 |
| Solvent - Xylol | 56.30 |
| | 1000.00 |

A wet film of this composition was applied by dipping and spinning to vehicle suspension springs and then heated for about 17 minutes with a maximum substrate temperature of about 350° F. to produce a thin cured coating (0.5 of a mil.). This coating tenaciously adhered to the springs and provided excellent protection of the springs from corrosion.

EXAMPLE 5

The following materials were added in the order listed to a vessel under slow agitation using a high speed Cowles dissolver.

| Material | Parts By Weight |
| --- | --- |
| Linear epoxy or phenoxy resin (PKHH, Union Carbide Corporation) with 30% solids by weight in methyl-ethyl-ketone | 583.33 |
| Calcium oxide | 1.71 |
| Suspension agent (MPA-60, Baker Castor Oil Co.) | 8.20 |
| Hygroscopic agent (Syloid AL-1, Davidson Chemical Co.) | 4.65 |
| Thixotropic agent (Tullonox-292, Tulco Co.) | 4.14 |
| Aluminum powder (nonleafing grade) as a stain resistant paste (#8271, Reynolds Metal Co.) with 65% solids by weight in mineral spirits | 76.92 |

These materials were mixed at a speed of about 2900 rpm with the Cowles dissolver until the mixture was heated to a temperature of about 135° F. The heated mixture was then pumped into a sand mill and milled to produce a homogeneous mixture having a Hegman particle size grind rating of 5.0 H. Thereafter, the homogeneous mixture was blended with the following materials to produce the completed composition.

| Material | Parts By Weight |
| --- | --- |
| Solvent - Dimethyl foramide | 25.00 |
| Solvent - Cellosolve acetate | 81.05 |
| Solvent - xylene | 90.00 |
| Resin - Melamine formaldehyde (MM-46, Reichhold Chemical Co.) with 60% solids by weight in xylol and butanol | 125.00 |
| | 1000.00 |

A wet film of this composition was applied by spraying to stamped blanks of terneplate for gasoline tanks and then heated for about 6 minutes with a maximum substrate temperature of about 415° F. to produce a thin cured coating (0.35 of a mil). This coating tenaciously adhered to the terneplate, provided excellent corrosion resistance, and was unaffected by ethanol, methanol, gasohol, leaded and unleaded gasoline, and diesel fuel.

I claim:

1. A corrosion resistant coating for application to and curing at an elevated temperature on a metal substrate comprising: powdered metal selected from the group consisting essentially of zinc, cadmium, stainless steel, aluminum, and alloys and blends thereof; said powdered metal having an average particle size not greater than about 40 microns and a maximum particle size not greater than about 100 microns; a resin system at least 80% by weight consisting essentially of thermoplastic linear phenoxy resin having a high molecular weight in the range of about 3,000 to 60,000 and essentially no highly reactive terminal epoxy groups, the balance of said resin system consisting essentially of formaldehyde, melamine, phenolic, and triazine resins and blends thereof; the quantity of said resin system being about 10% to 525% by weight of said powdered metal; active organic solvent selected from the group consisting essentially of acetone, cellosolve acetate, methyl ethyl ketone, methyl isobutyl ketone, dimethylformamide, and blends thereof; inactive organic solvent selected from the group consisting essentially of aromatic hydrocarbons, alcohols, and blends thereof in a quantity equal to about 0.1 to 0.4 by weight of said active organic solvent; and the total quantity of said organic solvents being sufficient for the composition to have a viscosity in the range of about 20 to 280 seconds with a Ford No. 4 cup.

2. The composition of claim 1 wherein said balance of said resin system consists essentially of melamine formaldehyde, urea-formaldehyde, hexomethoxmethyl-melamine, phenolic, and triazine resins and blends thereof.

3. The coating of claim 1 which also comprises a quantity of polyethylene equal to about 0.2% to 0.5% by weight of said powdered metal.

4. The coating of claim 1 which also comprises a quantity of a hygroscopic agent equal to about 0.2% to 12% by weight of said powdered metal.

5. The coating of claim 1 which also comprises a quantity of a hygroscopic agent equal to about 0.2% to 12% by weight of said powdered metal, said hygroscopic agent being selected from the group consisting essentially of calcium oxide, silica dioxide, barium oxide, and potassium chloride.

6. The coating of claim 1 which also comprises a quantity of thixotropic agent equal to about 0.4% to 12% by weight of said powdered metal.

7. The composition of claim 1 which also comprises a quantity of a silane treated silica dioxide thixotropic agent equal to about 0.4% to 12% by weight of said powdered metal.

8. The composition of claim 1 which also comprises sufficient thixotropic agent to maintain said powdered metal in a colloidal suspension.

9. The composition of claim 1 wherein said powdered metal has an average particle size not greater than about 10 microns.

10. The composition of claim 1 which also comprises sufficient calcium oxide to essentially neutralize the acidity of said liner phenoxy resin.

11. A method of protecting a metal substrate from corrosion comprising: applying to at least a portion of the surface of the substrate a thin and wet film of a liquid composition comprising powdered metal selected from the group consisting essentially of zinc, cadmium, stainless steel, aluminum, and alloys and blends thereof; said powdered metal having an average particle size not greater than about 40 microns and a maximum particle size not greater than about 100 microns; a resin system at least 80% by weight consisting essentially of a thermoplastic linear phenoxy resin having a high molecular weight in the range of about 3,000 to 60,000 and essentially no highly reactive terminal epoxy groups, the balance of said resin system consisting essentially of formaldehyde, melamine, phenolic, and triazine resins and blends thereof; the quantity of said resin system being about 10% to 525% by weight of said powdered metal; active organic solvent selected from the group consisting essentially of acetone, cellosolve acetate, methyl ethyl ketone, methyl isobutyl ketone, dimethylformamide, and blends thereof; inactive organic solvent selected from the group consisting essentially of aromatic hydrocarbons, alcohols, and blends thereof in a quantity equal to about 0.1 to 0.4 by weight of said active organic solvent; the total quantity of said organic solvents being sufficient for the composition to have a viscosity in the range of about 20 to 280 seconds with a Ford No. 4 cup; and heating the thin wet film to an elevated temperature for a sufficient period of time to evaporate the solvents and thereby tenaciously adhere the film to the substrate as a coating protecting the substrate from corrosion without heating any portion of the substrate to a temperature greater than 450° F.

12. The method of claim 11 wherein the thickness of the wet film of the composition applied to the substrate is not greater than about 3 mils.

13. The method of claim 11 wherein the thickness of the wet film applied to the substrate is not greater than about 3 mils and the thickness of the cured film on the substrate is not greater than about 0.8 of a mil.

14. The method of claim 11 wherein the wet film on the substrate is heated to an elevated temperature for a period of time in the range of about 40 minutes to 30 seconds and the maximum temperature of the substrate is in the range of about 300° F.

15. The method of making a corrosion resistant coating for application to and curing at an elevated temperature on a metal substrate comprising: mixing together powdered metal having an average particle size not greater than about 40 microns and a maximum particle size not greater than about 100 microns, said powdered metal being selected from the group consisting essentially of zinc, cadmium, stainless steel, aluminum, and alloys and blends thereof; a resin system at least 80% by weight consisting essentially of a thermoplastic linear phenoxy resin having a high molecular weight in the range of about 3,000 to 60,000 and essentially no highly reactive terminal epoxy groups, the balance of said resin system consisting of formaldehyde, melamine, phenolic, and triazine resins and blends thereof; the quantity of said resin system being equal to about 10% to 525% by weight of said powdered metal, and a quantity of active solvent equal to about one to two times the weight of the linear phenoxy resin; agitating the mixture of powdered metal, linear phenoxy resin, and organic solvent, while elevating its temperature to 120° F. to 180° F.; milling the heated mixture to produce a homogeneous mixture having a Hegman grind rating in the range of 4.5 H to 7.5 H; and thereafter, blending the homogeneous mixture with a sufficient quantity of active and inactive organic solvents sufficient for the final blend to have a viscosity in the range of about 20 to 280 seconds with a Ford No. 4 cup; said active organic solvent being selected from the group consisting of acetone, cellosolve acetate, methyl ethyl ketone, methyl isobutyl ketone, dimethylformamide and blends thereof, and said inactive solvent being selected from the group consisting essentially of aromatic hydrocarbons, alcohols, and blends thereof in a quantity equal to about 0.1 to 0.4 by weight of said active organic solvent.

16. The method of claim 15 wherein said balance of said resin system consists essentially of melamine formaldehyde, urea formaldehyde, hexomethoxymethyl melamine, phenolic, and triazine resins and blends thereof.

17. The method of claim 15 which also comprises including in the initial mixture of powdered metal, epoxy resin, and organic solvent, a quantity of thixotropic material equal to about 0.4% to 12% by weight of said powdered metal.

18. The method of claim 15 which also comprises including in the initial mixture of powdered metal, epoxy resin, and organic solvent, a quantity of a saline treated silica thixotropic agent equal to about 0.4% to 12% by weight of said powdered metal.

19. The method of claim 15 which also comprises including in the initial mixture of powdered metal, linear phenoxy resin and organic solvent, sufficient calcium oxide to essentially neutralize the acidity of the linear phenoxy resin.

* * * * *

UNITED STATES PATENT AND TRADEMARK OFFICE
CERTIFICATE OF CORRECTION

PATENT NO. : 4,391,855

DATED : July 5, 1983

INVENTOR(S) : Thurlow Geeck

It is certified that error appears in the above–identified patent and that said Letters Patent are hereby corrected as shown below:

IN THE CLAIMS:

Claim 10, line 3, "liner" should read "linear"

Claim 17, line 3, "epoxy" should read "linear phenoxy"

Claim 18, line 3, "epoxy" should read "linear phenoxy"

Signed and Sealed this

Eleventh Day of October 1983

[SEAL]

Attest:

GERALD J. MOSSINGHOFF

Attesting Officer     Commissioner of Patents and Trademarks